United States Patent Office 2,976,122
Patented Mar. 21, 1961

2,976,122
ANALYSIS OF HEAVY METAL IONS AND METAL CHELATES OF DIALKYL DITHIOPHOSPHORIC ACIDS

Henry R. Ertelt, Fanwood, Stephen L. Wythe, Plainfield, Michael J. Furey, Cranford, and John K. Appeldoorn, Westfield, N.J., assignors to Esso Research and Engineering Company, a corporation of Delaware No Drawing. Filed Dec. 7, 1955, Ser. No. 551,526

7 Claims. (Cl. 23—230)

This invention relates to metal-containing organic compounds and more particularly relates to compounds of certain metals with short chain dialkyl dithiophosphoric acids, which compounds have unique physical and chemical properties. The invention also relates to a novel method of preparation for these compounds and to their uses.

Metal-containing organic compounds are used extensively in industry in a variety of applications. For example, they have been used in the past as additives for compositions such as lubricating oils, greases, gasolines, heating oils, paints, insecticides, fungicides, etc. Metal-containing organic compounds have also been employed as reagents in analytical techniques, radioactive tracers, chemitherapeutic agents, reactants in various chemical processes, etc. There is a continuing need for novel metal-containing organic compounds which have outstanding chemical and physical properties and are therefore useful in a variety of applications.

THE COMPOUNDS

A novel class of metal-containing organic compounds which have outstanding and unique chemical and physical properties has now been discovered. This new class comprises compounds of short chain dialkyl dithiophosphoric acids with ions of certain metals. More specifically, these compounds are dialkyl dithiophosphoric chelates of the following metals:

Manganese, iron, cobalt, nickel, copper, silver, cadmium, indium, lead, tin, antimony and mercury.

The metal-containing compounds of this invention have unique physical and chemical properties. They are water-insoluble, and oil-soluble compounds; that is, they are freely soluble in many of the well-known organic solvents. Their properties are such as are associated with the compounds known as chelates. The metal compounds of the present invention are non-ionic and it is believed that their chemical structure may be represented as follows:

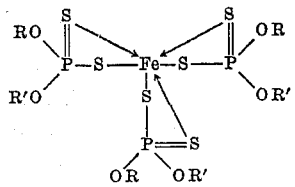

where M is one of the foregoing metals, $b$ is its valence and R and R' are alkyl groups having from 1 to 6 carbon atoms; e.g. propyl, and preferably branched alkyl groups, e.g. isopropyl. It is believed that the silver, nickel and iron compounds of this invention (for example) may be represented by the following chemical structural formulas:

(1) Silver

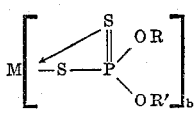

(2) Nickel

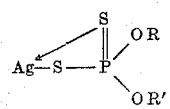

(3) Iron

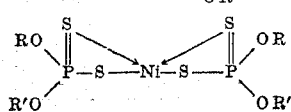

Although they all have some similar physical and chemical properties, such as water-insolubility and oil-solubility, it has been found that there is a wide variation among the different metal compounds with respect to many of their other physical and chemical properties. For example, solutions of these various metal compounds of dialkyl dithiophosphoric acids in solvents such as diethyl ether produce a variety of colors. It is believed that the unique chemical and physical properties of these compounds are more directly attributable to the metallic portion than to the alkyl groups. Specific examples of these alkyl groups in the present compounds include methyl, ethyl, propyl, isopropyl, butyl, isobutyl, amyl, isoamyl and isohexyl. The preferred alkyl group is isopropyl.

As specific examples of the metal compounds of this invention, the following may be mentioned:

Manganese with diisopropyl dithiophosphoric acid
Iron with methyl-isopropyl dithiophosphoric acid
Cobalt with dimethyl dithiophosphoric acid
Nickel with diisobutyl dithiophosphoric acid
Silver with diisohexyl dithiophosphoric acid
Cadmium with isobutyl-isohexyl dithiophosphoric acid
Indium with dimethyl dithiophosphoric acid
Lead with diisoamyl dithiophosphoric acid
Tin with methyl-isopropyl dithiophosphoric acid
Antimony with ethyl-isopropyl dithiophosphoric acid
Mercury with diisobutyl dithiophosphoric acid

METHOD OF PREPARATION

In accordance with this invention, these metal compounds with dialkyl dithiophosphoric acids are prepared using a novel method of preparation. More specifically, this novel method of preparation comprises reacting a water-soluble dialkyl dithiophosphate containing in the range of 1 to 6 carbon atoms in each alkyl group in aqueous solution with a water-soluble salt of a metal selected from the group consisting of manganese, iron, cobalt, nickel, copper, silver, cadmium, indium, lead, tin, antimony, and mercury, and separating the resultant water-insoluble compound from said aqueous solution. In some cases, the separation of the water-insoluble metal compound from the aqueous solution can be accomplished by filtration. However, for ease of recovery, it is preferred to extract the water-insoluble compound from the aqueous solution using a water-immiscible solvent for the metal compound. This particular method is also preferred since it produces a highly pure product free from contaminating water-soluble salts.

Expressed in another way, the method of this invention comprises (1) carrying out the following double decomposition reaction:

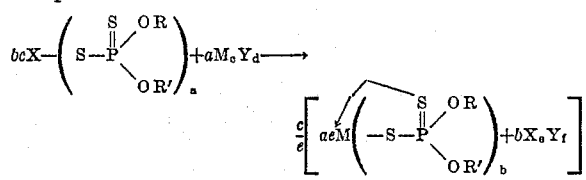

wherein R and R' are alkyl radicals, and preferably branched alkyl radicals, containing 1 to 6 carbon atoms; X is a metal selected from the group consisting of alkali and alkaline earth metals; M is a metal selected from the group consisting of manganese, iron, cobalt, nickel, silver, cadmium, indium, lead, tin, antimony and mercury; Y is an anion which forms water-soluble salts with metals of said last-mentioned group; "a" represents an integer from 1 to 2 corresponding to the valence of X; "b" represents an integer corresponding to the valence of M; "c" and "d" represent integers corresponding respectively to the number of cations and anions of M and Y in the compound $M_cY_d$; and "e" and "f" represent integers corresponding respectively to the number of cations and anions of X and Y in the compound $X_eY_f$; and (2) recovering the product

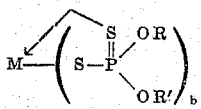

from the aqueous solution by extraction with a water-immiscible solvent for said product.

In the above chemical equation, the compound

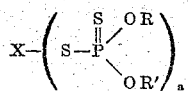

represents an alkali metal or alkaline earth metal, short chain dialkyl dithiophosphate. The preferred water-soluble dialkyl dithiophosphates are those of the alkali metals. Specific examples of these water-soluble dialkyl dithiophosphates include:

Sodium dimethyl dithiophosphate
Potassium diisopropyl dithiophosphate
Barium diisobutyl dithiophosphate
Calcium methyl-isopropyl dithiophosphate
Magnesium diisohexyl dithiophosphate The preferred water-soluble dialkyl dithiophosphates are those of sodium and potassium and those containing 3 carbon atoms in the alkyl groups.

In the above chemical equation, the compound $$M_cY_d$$

represents the water-soluble compound of a metal selected from the group consisting of manganese, iron, cobalt, nickel, copper, silver, cadmium, indium, lead, tin, antimony and mercury. Specific examples of such water-soluble salts which may be used in the method of this invention include iron sulfate, cadmium acetate, manganese chloride, cobalt nitrate, nickel nitrate, silver nitrate, indium sulfate, lead chloride, tin chloride and mercury nitrate. The preferred water-soluble salts are inorganic compounds. Preferably the anion Y is selected such that the by-product $X_eY_f$ is water-soluble.

The reaction described above may be conveniently carried out at room temperature and normal atmospheric pressures. However, if desired, temperatures in the range of about 70° to 200° F. may be employed. In carrying out the reaction, it will be understood that the water-soluble dialkyl dithiophosphate may be added to an aqueous solution of the salt $M_cY_d$, or the salt $M_cY_d$ may be added to an aqueous solution of the water-soluble dialkyl dithiophosphate. Of course, if desired, two separate aqueous solutions containing these two salts may be blended together to carry out the reaction. The amount of water is not too critical but should be sufficient to maintain in solution the reactants and the by-product salt $X_eY_f$. Stoichiometric proportions of the reactants may be employed as indicated by the chemical equation for the reaction shown above. However, it is preferred, in general, to use an excess of the water-soluble dithiophosphate in the reaction to assure complete utilization of the metal M. More specifically, it is preferred to use a stoichiometric excess on a mole basis in the range of about 5 to 20%. The reaction is essentially instantaneous and is preferably carried out with intimate stirring of the reagents. To assure substantial completion of the reaction, the reagents may be stirred together (or equivalent mixing method) for 5 to 30 minutes.

As specific examples of the reactions, the following are shown in terms of chemical equations:

(1)

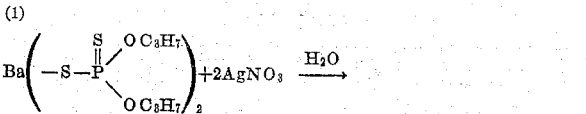

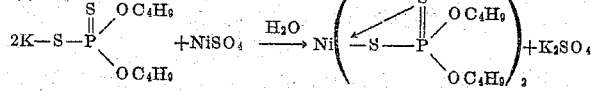

(2)

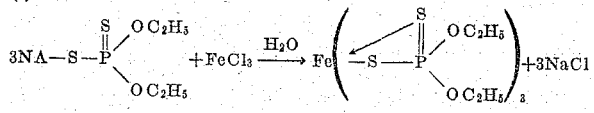

(3)

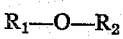

The metal-containing organic product is insoluble in water and may be separated from the aqueous solution by filtration or extraction. Extraction is preferred since it affords the recovery of a pure product. Also, recovery by extraction may be accomplished with greater ease than recovery by filtration. The extraction of the oil-soluble metal product is carried out with a water-immiscible solvent. The particular solvent employed will be dependent upon the particular oil-soluble metal product involved. It will be understood that the oil solubility of these metal products will be primarily dependent on the metal component and to a lesser extent the alkyl groups in the compound. Organic oxygen-containing solvents are particularly preferred, such as ethers, esters, alcohols and the like. The products of the present invention are also soluble in hydrocarbon solvents, such as hexane for example. Preferred hydrocarbon solvents are mineral oils boiling within the range of about 100° to 500°, preferably 250° to 400° F. Heavier mineral oils may be employed if desired, such as, for example, lubricating oils. Preferred hydrocarbon solvents are predominantly aliphatic hydrocarbons. These may be naphthas, refined mineral lubricating oils or individual hydrocarbons, such as pentane, hexane, heptane and the like, or mixtures thereof. The metal products of this invention are readily soluble in ethers having the formula $$R_1-O-R_2$$

wherein $R_1$ and $R_2$ are alkyl groups containing 2 to 10, preferably 2 to 5 carbon atoms. Preferably the organic solvent employed is a volatile solvent, that is, one boiling at normal atmospheric pressure below about 500° F., preferably below about 200° F. The use of such volatile solvents makes the recovery of the metal containing product simple in that the extract may be heated to volatilize the organic solvent, leaving the metal product as a residue.

In accordance with the present invention, pure metal dialkyl dithiophosphates may be prepared. In the first step of the preparation, a short chain alcohol of the formula $$ROH$$

is reacted with phosphorus pentasulfide. In the formula, ROH, for the alcohol, R represents an alkyl group containing 1 to 6 carbon atoms, preferably 3 to 4 carbon atoms and preferably branched. It will be understood that mixtures of such alcohols may be employed but, in general, a single alcohol will be employed. In carrying out the reaction between the alcohol and the phosphorus pentasulfide, approximately 4 moles of alcohol will be reacted with 1 mole of phosphorus pentasulfide ($P_2S_5$). This reaction is well known in the art and will generally be carried out at a temperature in the range of about 150° F. to 250° F. for about ½ to 2 hours. The product formed in this reaction is predominantly a dithiophosphoric acid of the formula

    (1)

However, small amounts of the following products are also formed in addition to by-product hydrogen sulfide:

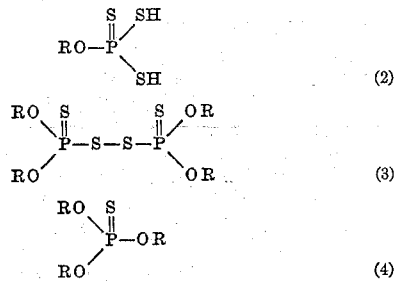

These acids may then be converted to their alkali or alkaline earth metal salts in the usual way, i.e., by neutralization with the appropriate oxides or by dioxides, in aqueous solution if desired. However, to minimize hydrolysis of the thiophosphoric acid, the following alternate procedure may be used. The reaction mixture resulting from the reaction between the alcohol and $P_2S_5$ is dissolved in a water-miscible alcohol. It is preferred to use the same alcohol where possible in forming this solution as was used in the reaction to thereby prevent any exchange of alcohol radicals between the solvent and the reaction products.

Then the reaction products are neutralized with a solution of an alkali metal or alkaline earth base, e.g., an alcoholate, preferably a sodium or potassium alcoholate. Neutralization may be indicated by the use of a pH indicator. For example, phenolphthalein may be added to the reaction mixture prior to the neutralization with an alkali or alkaline earth metal alcoholate. In this case, complete neutralization will be indicated by a change in color of the indicator, which occurs at a pH of about 9. It will be understood, however, that other pH indicators may be employed which will indicate a pH above 7. The alkali or alkaline earth metal alcoholate and the alcohol in which this alcoholate is dissolved should preferably contain the same alcohol radical as was used heretofore in the preparation. The alkali metal or alkaline earth metal alcoholate reacts with the following reaction products to form metal salts:

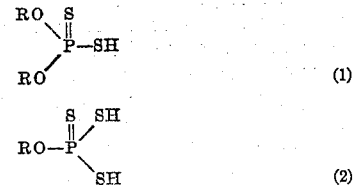

The alkaline alcoholate does not react as readily with the following reaction products:

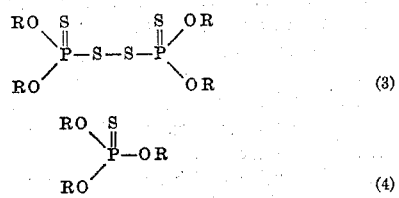

Then to the neutralized reaction mixture is added a large quantity of water sufficient to dissolve the resultant alkali or alkaline earth metal salts. The reaction products (3) and (4) are not soluble in water and are removed from the reaction mixture by extraction with an organic solvent such as hexane, for example.

To the resultant reaction mixture is then added the water-soluble salt $M_cY_d$ in an amount sufficient to carry out the aforedescribed reaction. The oil-soluble metal compound with dialkyl dithiophosphoric acid precipitates from the aqueous reaction mixture. This oil-soluble metal product is then extracted with a water-immiscible organic solvent as described heretofore in this specification. The extract may be then dried with, for example, sodium sulfate and the organic solvent may then be removed by distillation or evaporation to yield a pure compound of metal and dialkyl dithiophosphoric acid.

Thus the method for preparing a pure metal compound with dialkyl dithiophosphoric acid in accordance with the present invention comprises reacting about 1 mole of $P_2S_5$ at an elevated temperature with about 4 moles of alcohol, dissolving the resultant dialkyl dithiophosphoric acid in alcohol which corresponds to said aforementioned alcohol, neutralizing dialkyl dithiophosphoric acid with alkali metal alcoholate which is derived from an alcohol which corresponds to the aforementioned alcohol, dissolving the resultant alkali metal dialkyl dithiophosphate in water, removing insoluble materials from the resultant water solution of said dithiophosphate, adding an amount of a water-soluble salt of a metal selected from the group consisting of manganese, iron, cobalt, nickel, copper, silver, cadmium, indium, lead, tin, antimony and mercury, sufficient to precipitate out of said solution a compound of said metal with dialkyl dithiophosphoric acid, extracting the compound with a water-immiscible solvent, and then if desired evaporating the water-immiscible solvent to leave the pure compound.

METAL RECOVERY AND SEPARATION

The concept of the present invention has also been found to be useful in the field of metal recovery and separation. More specifically, the concept of the present invention provides a process whereby the metals manganese, iron, cobalt, nickel, copper, silver, cadmium, indium, lead, tin, antimony and mercury may be effectively recovered from aqueous solutions thereof. The method comprises adding to the aqueous solution containing ions of the above-mentioned metals a water-soluble dialkyl dithiophosphate containing in the range of 1 to 6 carbon atoms in each alkyl group. The water-soluble dialkyl dithiophosphate may be an alkali or alkaline earth metal dialkyl dithiophosphate and is preferably an alkali metal dialkyl dithiophosphate such as for example, sodium diisopropyl dithiophosphate or potassium dibutyl dithiophosphate. The addition of such water-soluble dialkyl dithiophosphates results in a reaction as has been described in detail heretofore forming water-insoluble compounds of the aforesaid metals desired to be recovered. In some cases (i.e. when the product is a solid) these water-insoluble metal compounds may be recovered by filtration from the aqueous solution, but preferably they are removed by extraction with a water-immiscible solvent, preferably a dialkyl ether containing 2 to 5 carbon atoms in each alkyl group. Hexane is also a useful organic solvent which may be used in general in this extraction step. If only one of the metals of the group consisting of manganese, iron, cobalt, nickel, copper, silver, cadmium, indium, lead, tin, antimony and mercury is present in the aqueous solution, the present method is extremely useful in recovering this metal from the aqueous solution or separating this metal from an aqueous solution containing other metal ions such as alkali metal or alkaline earth metal ions. The amount of the water-soluble dialkyl dithiophosphate added to the water solution in general should be sufficient to precipitate all of the metal ions of the aforementioned group. Thus, in general, the water-soluble dialkyl dithiophosphate will be added to the aqueous solution until no further precipitation of water-insoluble dithiophosphate products is formed.

ANALYTICAL PROCEDURE

The concept of the present invention has also been found to be applicable to analytical techniques. More specifically, it has been found that the present concept may be employed to analyze for dithiophosphoric radicals in solutions, either aqueous or non-aqueous, or to analyze for metals in solution, either aqueous or non-aqueous, of the group consisting of manganese, iron, cobalt, nickel, copper, silver, cadmium, indium, lead tin, antimony and mercury.

In accordance with the present invention, the analysis of particularly nickel, cobalt, iron or copper in aqueous solutions may be carried out by adding a predetermined amount of a water-soluble dialkyl dithiophosphate having 1 to 6 carbon atoms in each alkyl group to a predetermined volume of the aqueous solution, then extracting the resultant water-insoluble compound of the metal with a predetermined volume of water-immiscible solvent. Due to the intensity of color of the resultant nickel, iron, cobalt or copper compound, it is then possible to determine colorimetrically the amount of such ions present. Thus a series of standard samples may be prepared for each of the four metals, the intensity of color of the samples in the series for each metal being directly proportional to the concentration of the metal present. Thus, this particular analytical method of the present invention provides a rapid means for analyzing the amount of nickel, cobalt, iron or copper in aqueous solutions. It will be understood that, if desired, the water-immiscible solvent may be removed by distillation or evaporation and the amount of the nickel, cobalt, iron or copper compound with dialkyl dithiophosphoric acid determined by gravimetric or volumetric analysis. Preferred solvents useful in this analytical technique include hexane and low boiling dialkyl ethers such as diethyl ether.

Frequently it is desirable to determine the dithiophosphate concentration in oil blends, which blends contain dithiophosphate additives. The amount of dithiophosphate may be determined in accordance with this invention by intimately mixing a predetermined amount of a water-soluble salt of a metal selected from the group consisting of nickel, iron, cobalt or copper in water solution with a predetermined amount of the oil composition, separating the oil composition from the water solution and then measuring the intensity of the color of the oil composition. Since nickel, cobalt, iron and copper form compounds with dialkyl dithiophosphoric acids producing an intense color in organic solvents (including conventional lubricating oils) it is possible to determine colorimetrically the concentration of thiophosphates by the method of this invention. Nickel, iron and cobalt salts are preferred since they give more intense colors than does copper. The addition of the nickel, iron, cobalt or copper salt to the oil composition containing, for example, sodium dithiophosphate, calcium dithiophosphate, barium dithiophosphate (i.e. alkali and alkaline earth metal dithiophosphates), zinc dithiophosphate and the like produces a compound of nickel, iron, cobalt or copper with dialkyl dithiophosphoric acid which imparts an intense color to the oil solution. Again, standard oil solutions containing varying amounts of the compounds of dialkyl dithiophosphoric acids with iron, nickel, cobalt or copper may be prepared so that a standard series is available for comparison with the unknown oil composition sampled. In carrying out this particular analytical technique, the aqueous nickel, iron, cobalt or copper salt is added until there is no further change in the color intensity detected by addition of further aqueous salt.

OTHER APPLICATIONS

It has been found that the novel oil-soluble metal compounds of this invention have many applications. They are, for example, extremely useful as oil additives for lubricating oils, both mineral and synthetic, heating oils, diesel oils, gasolines, greases and the like. It has been found, for example, that the manganese, iron, cobalt, nickel, silver, cadmium, indium and lead compounds of this invention are useful anti-wear additives and load-carrying additives in mineral and synthetic lubricating oils. The cadmium, lead, and cobalt compounds with dialkyl dithiophosphoric acids have been found to be particularly effective in this respect. These additives are also useful as corrosion inhibitors in mineral and synthetic lubricating oils as well as in heating oils, diesel oils, greases and the like. The compounds are also useful as anti-oxidants in mineral and synthetic oils, particularly in synthetic lubricating oils such as polyethers, formals, esters and the like. The nickel, cobalt, iron and copper compounds are also useful as combustion modifiers in gasolines. In general, therefore, all of the compounds of this invention are useful as oil additives. Their value derives from the unusual oil solubility of the compounds which contain relatively high proportions of metal, phosphorus and sulfur as compared to the hydrocarbon portion of the molecule. The compounds of the various metals are not equivalent in all applications and the particular application desired will determine which of the metal compounds of this invention will be employed.

The novel products of this invention may be also used in applications wherein an oil-soluble radioactive tracer is required. Radioactive compounds of this invention may be prepared from radioactive forms of the various metals. For example, cobalt$^{60}$ is an extremely useful and readily available radioactive element which may be converted into a water-soluble salt and then used to combine with a dialkyl dithiophosphoric acid in accordance with this invention. Such radioactive compounds are extremely useful in many radioactive tracing operations due to their high degree of oil solubility and their high proportion of metal content. These compounds (e.g. of cobalt) have the additional advantage in that they will not be leached out by water or cause emulsification of water in oil. Specific example where such radioactive metal compounds may be employed is in the tracing or location of pipelines. The application of oil-soluble radioactive tracers is well known in the art and it will be understood that the radioactive metal compounds of this invention may likewise be used in such applications.

The novel products of this invention are also useful as additives for paints. Thus the compounds of cobalt, lead and manganese, for example, are effective catalysts for accelerating the rate of drying of paints. These metal compositions of this invention have an advantage over conventional metal compositions since the present compounds are not leached out of the paint by water since they are water insoluble and readily oil soluble. This unique property of the present compounds makes them useful additives also for marine paints wherein they would also serve as anti-fouling agents. The cadmium, mercury and copper metal products of this invention are especially useful in this particular application.

The metal compounds of this invention may also be used as antiseptics, bacteriostatic agents, or for chemotherapeutic use and as additives for insecticides, fungicides and herbicides.

The invention will be more fully understood by reference to the following examples. It is pointed out, however, that the examples are given for the purpose of illustration only and are not to be construed as limiting the scope of the present invention in any way.

Example I

PREPARATION OF NICKEL COMPOUND WITH DIISOPROPYL DITHIOPHOSPHORIC ACID

To 500 cc. of distilled water was added 20 g. of potassium diisopropyl dithiophosphate (commercial grade) and 10 g. of nickel nitrate hexahydrate, and the aqueous reaction mixture shaken in a flask for 5 minutes. A dark purple solid formed which was then extracted into 500 cc. of diethyl ether. The ether extract was washed with about 250 cc. of water and then dried for about 10 hours over anhydrous sodium sulfate. The ether extract was then filtered and the ether was evaporated on a steam table to yield 16 g. of a dark purple compound of nickel.

Example II

PREPARATION OF IRON COMPOUND DIISOPROPYL DIISOPROPYL DITHIOPHOSPHORIC ACID

28 g. of potassium diisopropyl dithiophosphate (commercial grade) were dissolved in about 500 cc. of distilled water; 5.4 g. of ferric chloride hexahydrate were dissolved in about 50 cc. of distilled water and the two aqueous solutions were combined and shaken together for about 5 minutes in a 3-liter separatory funnel. A very heavy black salt formed which was then extracted into about 500 cc. of diethyl ether. Then 2 g. of ferric chloride hexahydrate were added to the extracted water solution to insure complete reaction of the thiophosphate. The aqueous solution was reextracted with 250 cc. of ether and the ether extracts combined and dried over anhydrous sodium sulfate. The ether extract was then filtered and evaporated on a steam table to yield 16.3 g. of a black compound of iron.

Eaxmple III

PREPARATION OF LEAD COMPOUND WITH DIISOPROPYL DITHIOPHOSPHORIC ACID

4.6 g. of lead acetate trihydrate were dissolved in 100 cc. of distilled water and filtered. Then 5 g. of potassium diisopropyl dithiophosphate (commercial grade) were dissolved in 100 cc. of distilled water. The two aqueous solutions were mixed and shaken together, resulting in a finely divided white precipitate which was then extracted into about 250 cc. of diethyl ether. The ether extract was dried overnight over sodium sulfate, filtered and dried on a steam table to evaporate the ether. A yield of 7 g. of white crystalline compound of lead was obtained.

Example IV

PREPARATION OF CADMIUM COMPOUND WITH DIISOPROPYL DITHIOPHOSPHORIC ACID

5.8 g. of cadmium chloride·2.5$H_2O$ in 100 cc. of distilled water and 5.0 g. of potassium diisopropyl dithiophosphate (commercial grade) in 100 cc. of distilled water were mixed and shaken together, giving a white solid precipitate which was then extracted with two 500 cc. portions of diethyl ether. The ether extracts were combined and dried overnight over sodium sulfate, filtered and the ether evaporated on a steam table. A yield of 4.8 g. of waxy white crystals of a compound of cadmium was obtained.

Example V

PREPARATION OF CUPRIC COMPOUND WITH DIISOPROPYL DITHIOPHOSPHORIC ACID

An aqueous solution of 21.4 g. of potassium diisopropyl dithiophosphate (commercial grade) in 150 cc. of distilled water and an aqueous solution of 12.5 g. of cupric sulfate pentahydrate in 100 cc. of distilled water were prepared separately. The two aqueous solutions were mixed and thoroughly shaken in a separatory funnel, resulting in the formation of a dark yellow-brown precipitate which was then extracted into about 500 cc. of diethyl ether. The ether extract was dried overnight over sodium sulfate and the ether evaporated on a steam table. A yield of 18 g. of a dark yellow-brown cupric salt was obtained.

Example VI

PREPARATION OF CUPROUS COMPOUND WITH DIISOPROPYL DITHIOPHOSPHERIC ACID

An aqueous solution of 21.4 g. of potassium diisopropyl dithiophosphate (commercial grade) dissolved in 150 cc. of distilled water was prepared. Then 9.9 g. of cuprous chloride (slightly water soluble) were added to the aqueous solution of potassium diisopropyl dithiophosphate in increments of about 2 g. After the addition of each increment, a dark yellow precipitate formed which was extracted into about 100 cc. of diethyl ether. This alternate procedure of addition of cuprous chloride salt and extract was continued until no more coloration occurred. The ether extracts were then combined and dried over sodium sulfate overnight, filtered and the ether evaporated on a steam table. A yield of 18.5 g. of a dark yellow cuprous salt was obtained.

Example VII

PREPARATION OF DI(4-METHYL-2-PENTYL) DITHIOPHOSPHORIC ACID (DI-ISOHEXYL DITHIOPHOSPHORIC ACID)

1008 g. of $P_2S_5$ were added over a period of about 1.5 hours to 1848 g. of methyl isobutyl carbinol. The temperature during the addition of $P_2S_5$ was maintained in the range of about 185 to 200° F. Thereafter the reaction mixture was heated for about 1 hour at a temperature in the range of about 180 to 200° F. and thereafter heated at about the same temperature with nitrogen blowing for an additional hour. The reaction mixture was then filtered, using Hi-Flo filter aid. The resultant product was a dark blue-green clear liquid which analyzed 10.54% phosphorus and 21.5% sulfur, corresponding to a di-isohexyl dithiophosphoric acid.

Example VIII

PREPARATION OF SODIUM DI-ISOHEXYL DITHIOPHOSPHATE

65 g. of sodium methylate were dissolved in 722 g. of methyl alcohol and phenolphthalein indicator added to make the solution pink. Then 400 g. of di-isohexyl dithiophosphoric acid prepared as described in Example VII were dissolved in sufficient methyl alcohol to produce 1000 ml. of the acid-methyl alcohol solution. Then 920 ml. of the acid-methyl alcohol solution were added to the methyl alcohol solution of sodium methylate, at which point the phenolphthalein indicator changed to a yellow color, indicating neutralization and formation of sodium di-isohexyl dithiophosphoric acid. The resultant reaction mixture was then diluted with an equal volume of distilled water with intimate mixing. The resultant aqueous solution was extracted twice with hexane using a volume of hexane in each case equivalent to about 50% by volume of the aqueous solution. The hexane extract was discarded. About 2500 ml. of an aqueous methyl alcohol solution of sodium di-isohexyl dithiophosphate were obtained.

Example IX

PREPARATION OF VARIOUS METAL COMPOUNDS WITH DI-ISOHEXYL DITHIOPHOSPHORIC ACID

Aqueous solutions of the following metal salts were prepared which consisted of about one-third by weight of the salt and two-thirds by weight of distilled water, and then sodium di-isohexyl dithiophosphate in aqueous methyl alcohol solution (as prepared above) was added to aqueous solutions of the aforementioned salts in the following proportions:

| Metal | Salt | Amount of Sodium Dithiophosphate Solution (ml.) | Amount of Metal Salt Solution (ml.) |
|---|---|---|---|
| Mn | MnCl$_2$·4H$_2$O | 250 | 50 |
| Fe | FeCl$_3$·6H$_2$O | 350 | 50 |
| Co | Co(NO$_3$)$_2$·6H$_2$O | 200 | 50 |
| Ni | Ni(NO$_3$)$_2$·6H$_2$O | 250 | 50 |
| Cu | CuCl$_2$·2H$_2$O | 250 | 50 |
| Ag | AgNO$_3$ | 200 | 50 |
| Cd | CdCl$_2$·5H$_2$O | 250 | 50 |
| In | InCl$_3$ | 250 | 40 |
| Pb | Pb(NO$_3$)$_2$ | 200 | 50 |

In each case a water-insoluble precipitate was formed. Then the solutions were extracted twice into about 1000 cc. of hexane, the hexane extracts combined and washed twice with about 500 cc. of distilled water in order to wash out any inorganic salt contaminants. The extracts were then filtered and dried, using about 100 g. of anhydrous sodium sulfate which was added to the hexane solutions in each case and allowed to stand for two days to dry. The resultant dried hexane solutions of the various metals with di-isohexyl dithiophosphoric acid had the following colors:

| Metal | Color of Hexane Solution |
|---|---|
| Mn | Clear amber. |
| Fe | Black. |
| Co | Dark yellow-green. |
| Ni | Deep violet. |
| Cu | Deep yellow-green. |
| Ag | Clear burgundy red. |
| Cd | Clear, colorless. |
| In | Clear light yellow. |
| Pb | Colorless. |

The hexane in each of the extracts was then evaporated over a steam bath and the following metal-containing products were obtained:

| Metal | Color of Product | Product Yield (Gms.) | Percent Metal | Percent P | Percent S |
|---|---|---|---|---|---|
| Mn | Brown | 16.5 | (¹) | 9.5 | 18.7 |
| Fe | Brown-tan | 27.0 | 5.3 | 9.4 | 18.4 |
| Co | Yellow-green | 23.5 | 7.0 | 8.8 | 17.7 |
| Ni | Violet | 24.5 | 8.8 | 9.0 | 17.0 |
| Ag | Ruby red | 26.2 | 27.8 | 8.2 | 14.5 |
| Cd | Light yellow | 26.0 | 14.5 | 8.2 | 17.0 |
| In | Yellow | 18.0 | 11.6 | 9.5 | 17.1 |
| Pb | Tan | 21.0 | 26.0 | 8.0 | 15.5 |
| Cu | Yellow-green | 25.0 | 10.0 | 8.8 | 17.6 |

¹ Not determined.

Example X

Metal-containing products prepared as described in Example IX were then evaluated as load-carrying agents in the Shell E.P. test. In each case an oil blend was prepared using a narrow cut mineral oil distillate having a viscosity of about 75 SSU at 100° F. and using an amount of the metal compound with di-isohexyl dithiophosphoric acid sufficient to give a phosphorus content in the oil blend of 0.1 weight percent (this was approximately equivalent to 1 weight percent concentration of the additive in the oil blend).

The Shell E.P. test is carried out as follows:
The test lubricant is placed in the cup of the machine at room temperature. This cup also contains three steel balls which are fixed in position by a screw cap. A fourth steel ball, held in a chuck, is pressed against the three lower balls with a known force and is rotated at 1800 revolutions per minute. One minute tests are run at increasing load increments using a new set of balls for each load. Using this procedure, the maximum load that can be carried without metal scuffing or film failure is determined.

The following results were obtained in the above-described test:

| Additive in Base Stock | Maximum Load, Shell E. P. Tests, Kg. |
|---|---|
| None | 45 |
| Metal in Additive: | |
| Mn | 75 |
| Fe | 75 |
| Co | 80 |
| Ni | 55 |
| Ag | 75 |
| Cd | 80 |
| In | 70 |
| Pb | 85 |

It will be noted that the cadmium, lead and cobalt containing additives were particularly effective load-carrying agents.

Example XI

ANALYSIS FOR Zn DITHIOPHOSPHATE

Blends of zinc di(4-methyl-2-pentyl) dithiophosphate in a mineral oil of lubricating viscosity were prepared at different concentrations. 5 cc. of each oil blend was diluted with 5 cc. heptane to provide greater fluidity. 5 cc. of this fluid was then added to 5 cc. of an aqueous solution of 10% Ni(NO$_3$)$_2$·6H$_2$O followed by 1 minute of shaking. The formation of a violet color was noted and the mixture was allowed to stand for 20 minutes. The optical density of the non-aqueous layer at a wavelength of 550 millimicrons was then determined with a Beckman spectrophotometer using 1 cm. Corexcells. The results of this experiment, shown below in the table illustrate that this method can be used to determine the concentration of zinc dithiophosphate.

| Concentration of Zinc Dialkyldithiophosphate In Mineral Oil, mg./ml. | Optical Density |
|---|---|
| 0 | 0 |
| 0.125 | 0.010 |
| 0.250 | 0.024 |
| 0.50 | 0.050 |
| 1.0 | 0.112 |
| 2.0 | 0.225 |
| 2.5 | 0.286 |
| 5.0 | 0.570 |

What is claimed is:

1. A method for determining the concentration of an aqueous solution of a heavy metal ion selected from the group consisting of nickel, iron, cobalt and copper which comprises precipitating said heavy metal ion from said aqueous solution by adding a water soluble metal dialkyl dithiophosphate, the metal being selected from the group consisting of alkali and alkaline earth metals and the alkyl radicals having in the range of 3 to 4 carbon atoms; extracting the precipitate containing said heavy metal ion with a predetermined volume of a water immiscible solvent; and determining the concentration of the heavy metal ion responsive to the color of the solvent extract, the color intensity of the solvent extract being directly proportional to the concentration of the heavy metal ion present therein.

2. The method according to claim 1 wherein said heavy metal ion is nickel.

3. The method according to claim 1 wherein said heavy metal ion is iron.

4. The method according to claim 1 wherein said heavy metal ion is copper.

5. The method for determining the concentration of dialkyl dithiophosphate radical in an oil solution which comprises intimately mixing with said oil solution an aqueous solution of a water soluble salt of a metal selected from the group consisting of nickel, iron, cobalt and copper, said water soluble salt being added until no further change in color is detected in said oil solution; and determining the concentration of said dialkyl dithiophosphate radical responsive to the color of said oil solution, the color intensity of said oil solution being directly proportional to the concentration of dialkyl dithiophosphate radical present therein.

6. The method according to claim 5 wherein said dialkyl dithiophosphate radical in said oil solution is in the form of a dithiophosphate of a metal selected from the group consisting of alkali metals, alkaline earth metals and zinc.

7. The method according to claim 6 wherein said metal is zinc.

References Cited in the file of this patent

UNITED STATES PATENTS

| | | |
|---|---|---|
| 2,063,629 | Salzberg et al. | Dec. 8, 1936 |
| 2,346,155 | Denison et al. | Apr. 11, 1944 |
| 2,368,000 | Cook et al. | Jan. 23, 1945 |
| 2,410,650 | Giammaria | Nov. 5, 1946 |
| 2,456,692 | Farkas et al. | Dec. 1, 1948 |
| 2,637,631 | Gehauf et al. | May 5, 1953 |
| 2,798,880 | Williams et al. | July 9, 1957 |

OTHER REFERENCES

Gaudin: Flotation, 1932 ed., pages 74, 169, 180, 229.

Doklady Akad Nank, 1954, vol. 98, pages 79–81.

Makens: Anal. Chem. 1955, vol. 27, pages 1062–1064.

Masoero: Chim. e Ind.; November 1955, vol. 27 (12) pp., 945–949.

Welcher: Organic Anal. Reagents, vol. IV, 1948, pages 82–91.

Mastin et al.: "J.A.C.S." 67, pps. 1662–1664 (1945).